May 1, 1934.  E. W. MIKAELSON  1,956,906
MACHINE FOR COILING STRIPS
Filed Aug. 16, 1932  2 Sheets-Sheet 1
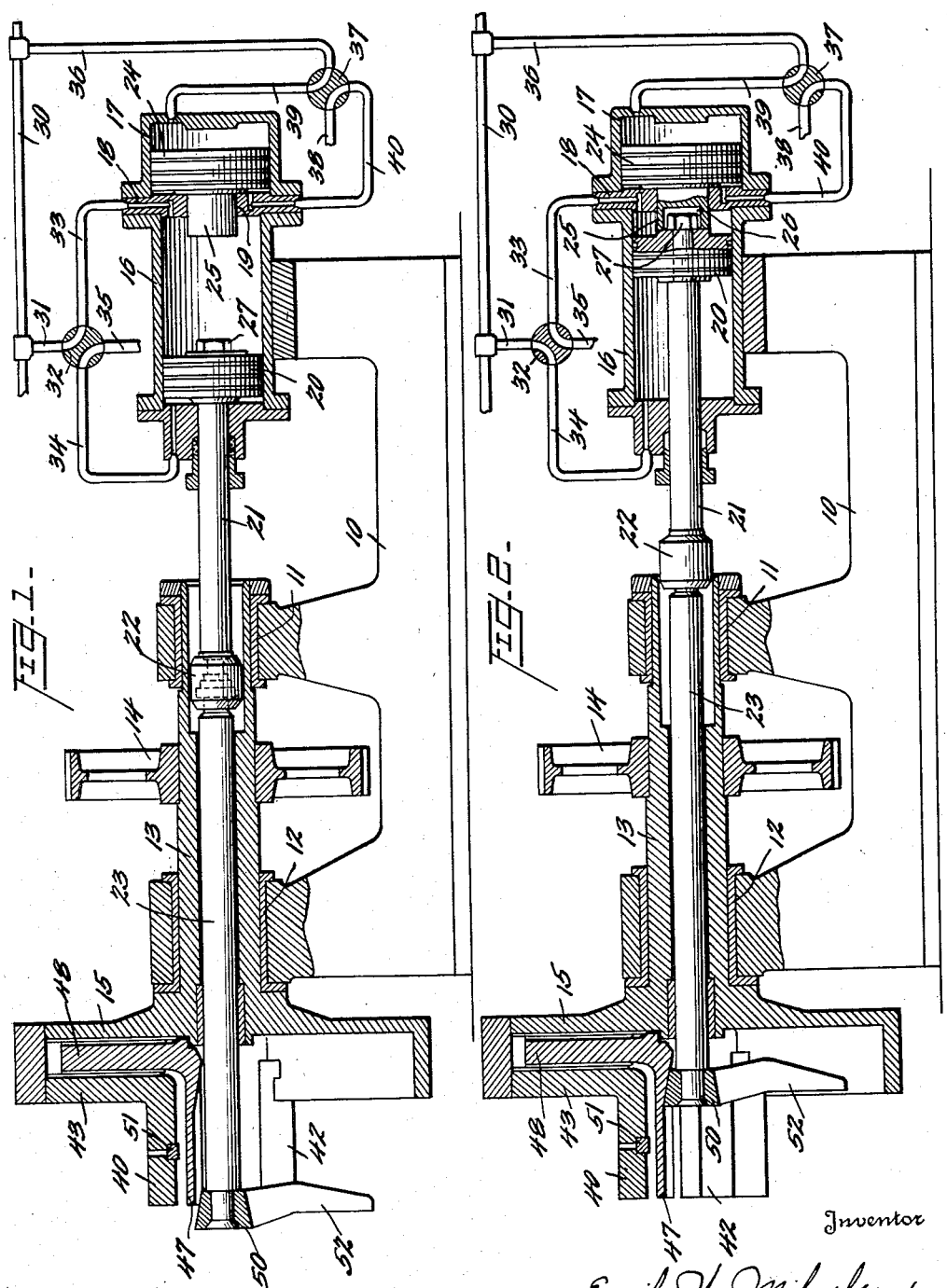
Inventor
Erik W. Mikaelson
By Watson, Coit, Morse & Grindle
Attorney

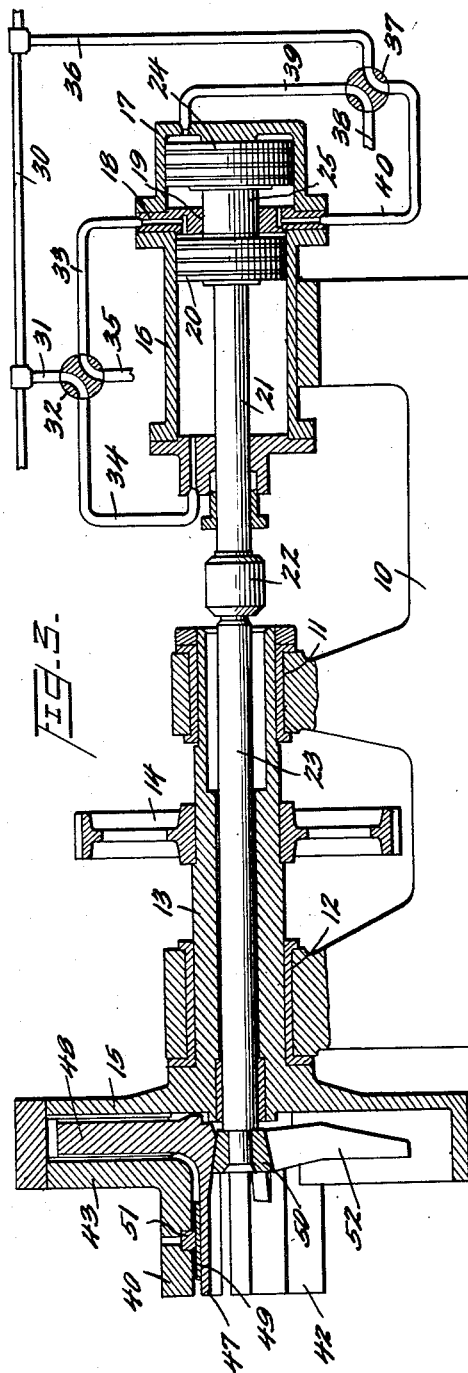
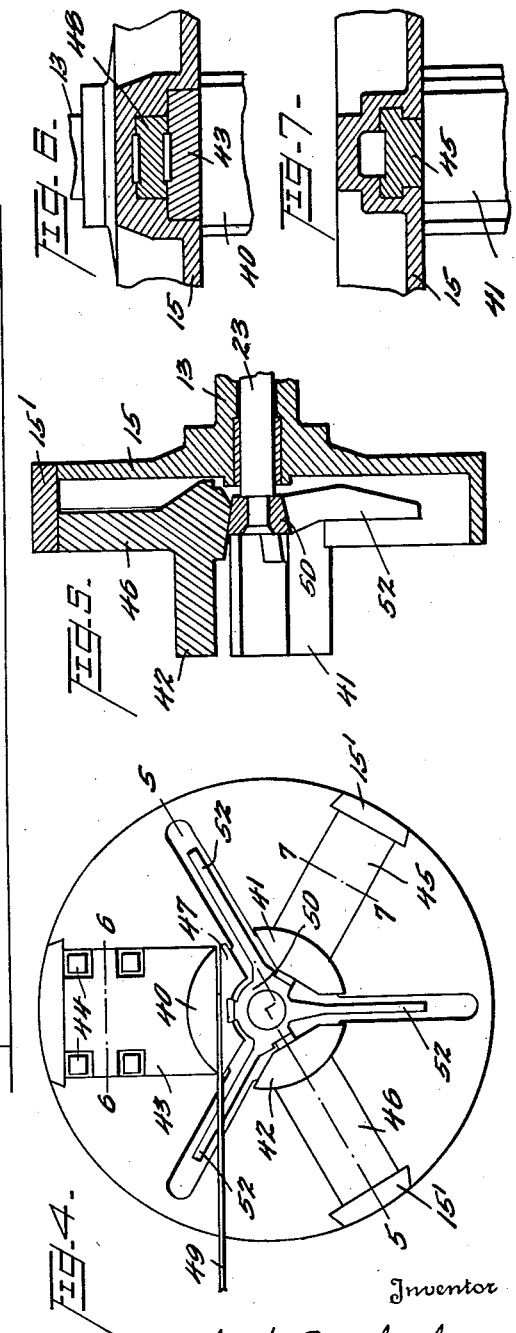

UNITED STATES PATENT OFFICE 1,956,906

MACHINE FOR COILING STRIPS

Erik W. Mikaelson, Easton, Pa., assignor to Treadwell Engineering Company, Easton, Pa., a corporation of Pennsylvania Application August 16, 1932, Serial No. 629,079

5 Claims. (Cl. 242—81)

The present invention relates to fluid operated actuating or adjusting mechanisms of general utility in the industrial arts but particularly adapted for use in connection with strip coiling machines.

Many machines or instrumentalities now in use have one or more operating parts, the positions of which must be adjusted from time to time in facilitating or controlling the operations thereof. While it is possible to effect such adjustments manually in most instances, it is the tendency for machine designers and builders to supply power operated devices or servo mechanisms by means of which the operator may effect the necessary adjustments or changes of position of a movable part by throwing a switch or turning a valve.

Various fluid operated mechanisms of this type have been heretofore designed or suggested and have proven popular in actual use, such, for instance, as the combination with a part to be actuated or adjusted of a pressure cylinder with a reciprocable piston therein, to which such part is connected by a piston rod. Devices of this kind, while entirely satisfactory for the purpose of moving an element from one extreme position to another, have not proven so satisfactory in those instances where it is necessary or desirable to move the operated element into one of three or more different positions, thus calling for intermediate positioning of the piston in the cylinder. While it has previously been suggested that mechanical means may be adopted for locking the piston rod in various predetermined positions or for locking the piston against movement by blocking the fluid connections leading to the ends of the cylinder, devices of this character have, for one reason or another, not come into popular use.

In accordance with the present invention, a fluid pressure mechanism is provided by means of which a mechanical element may be moved into any one of three or more positions, including one or more intermediate positions, and very definitely and accurately held in such intermediate position at the will of the operator and without danger of accidental movement or creeping. The invention may have various embodiments and may be applied to many different types of machines. By way of example, one form of the invention is illustrated in the accompanying drawings and will be hereinafter described in detail, the invention being shown as incorporated in a machine for coiling strips, with which it is found to be especially useful. Obviously, however, in adapting the invention to other types of machines, the design and arrangement of its component elements may be considerably modified.

In the drawings:

Figures 1, 2, and 3 are similar views taken axially through the machine but showing the several parts thereof in different operating positions;

Figure 4 is an end elevation of the same; and

Figures 5, 6, and 7 are sections on lines 5—5, 6—6, and 7—7, respectively, of Figure 4.

The strip coiling machine selected for disclosure by way of example is mounted upon a base 10 of any suitable shape or construction. Supported upon pedestals forming portions of the base are cylindrical bearings 11 and 12, respectively, and these bearings in turn rotatably support a hollow cylindrical shaft or arbor 13 upon which is fixed a pulley or gear 14 by means of which it may be rotated. Beyond the bearing 12, shaft 13 is provided with a disc like enlargement or head 15 upon which the various strip gripping and coil supporting members are mounted. These members will be hereinafter more specifically referred to. Beyond the opposite end of the hollow shaft 13 and in axial alignment therewith are two preferably coaxial cylinders 16 and 17 respectively, these cylinders being separated by a dividing place 18 having a central cylindrical aperture 19. A piston 20 in that cylinder which is nearest the shaft 13 is provided with a piston rod 21 extending through a packing gland in the cylinder end wall and connected by means of a swivel joint 22 with a spindle 23 extending axially through the cylindrical shaft 13 and being slidable longitudinally therein.

Located within cylinder 17, which cylinder is, as may be observed, of larger diameter than cylinder 16, is a piston 24. Piston 24 carries a cylindrical member 25 disposed axially thereof and extending through and slidably engaging the cylindrical wall of aperture 19 in the dividing plate 18. Member 25 is of such length that, for all positions of its operating piston 24, some portion of it lies within the cylindrical aperture 19 and serves as means for blocking any flow of fluid from one cylinder to another. The two extreme positions of piston 24 may be observed from an inspection of Figures 1 and 3, from which figures it appears that, when piston 24 is at one end of cylinder 17, the member 25 projects into the cylinder 16 for a considerable distance whereas, when piston 24 is at the opposite end of its stroke, member 25 projects a less distance into cylinder 16 or is completely withdrawn therefrom.

From an inspection of Figure 2, it will be observed that the end of member 25 is cupped as at 26 so as to receive the end of piston rod 21, which passes entirely through piston 20, and also the nut 27 threaded thereon.

A fluid supply line is indicated at 30, this line being adapted to carry air, oil, or other suitable fluid under high pressure from a suitable source of supply to the vicinity of the cylinders 16 and 17. A branch pipe 31 may be connected by means of a valve 32 with either conduit 33 or conduit 34, these conduits leading to opposite ends of cylinder 16, respectively, so that fluid pressure may be built up within the cylinder upon either side of the piston as desired to effect movement thereof, the space on the opposite side of the piston being, by the same movement of the valve, connected to a discharge pipe 35. By means of a pipe 36 and a similar valve 37, fluid pressure may be built up in either end of cylinder 17 and the opposite end connected to a discharge pipe 38. The pipes leading from valve 31 to the opposite ends of cylinder 17 are indicated at 39 and 40, respectively.

Inasmuch as piston 24 is of larger diameter than piston 20, no effort which may be developed by piston 20 under the influence of its propelling fluid can overcome the effort which piston 24 is capable of exerting in the opposite direction (see Figure 2), and hence, when the valves are positioned as shown in Figure 2, piston 20 is brought to a full and definite stop when it comes in contact with the annular end of member 25. It is thus halted in a predetermined position in its travel and cannot progress further, despite the pressure of fluid behind it, unless the fluid pressure behind piston 24 is relieved. When it is desired to permit piston 20 to move toward the right to the full extent of its stroke, valve 37 is moved to the position in which it is shown in Figure 3, thus relieving the pressure behind piston 24 and building up pressure on the left-hand side of this piston, which promptly moves to its extreme position as shown in this figure. By the mechanism described, piston rod 21 and spindle 23 may be given any one of three very definite predetermined positions, two of these positions being those corresponding to the extreme movements of piston 20 and the third corresponding to an intermediate position of piston 20. All of this greatly facilitates speed and ease and accuracy of operation of the strip coiling machine, as will be now pointed out.

The rotatable head 15 of the strip coiling apparatus carries three segments indicated, respectively, at 40, 41, and 42, segment 40 being integral with a plate 43 rigidly secured by bolts 44 to the head, whereas segments 41 and 42 are secured respectively to radially disposed and slidably mounted supporting and guiding plates 45 and 46, respectively. Segments 41 and 42 may be so adjusted radially that the cylindrical surfaces thereof are concentric with the cylindrical surface of segment 40, thus providing in effect a cylindrical drum, the surface of which is interrupted at three points, and upon which the strip is adapted to be coiled in the operation of the machine. Radial movements of segments 41 and 42 are controlled by a pusher head 50 secured to the end of spindle 23, this pusher head having inclined faces which bear respectively against correspondingly inclined faces of the segments, axial movement of the spindle to the right causing the pusher head to wedge segments 41 and 42 outwardly to the positions shown in Figure 4.

A gripping member is indicated at 47, this member having a surface disposed parallel to the inner surface of stationary segment 40 so that movement thereof toward segment 40 will result in clamping of the leading edge of a strip lying therebetween. Gripping member 47 likewise is provided with a guiding and supporting plate 48, which is retained in position behind plate 43, and has an inwardly facing inclined surface which rests against a correspondingly inclined face of the pusher head 50. As a result of this arrangement, movement of the pusher head 50 toward the right not only effects radial outward movement of segments 41 and 42 but likewise effects outward movement of gripping member 47 so that a blank, indicated at 49, and having its leading edge between member 47 and drum segment 40, will be positively gripped between said members, an insert 51 being provided if desired to insure proper frictional engagement between the gripping elements and the strip. As will be apparent from an inspection of Figure 5, outward movement of plates 45 and 46 is limited by reason of the fact that the outer ends of these plates contact with the circumferential flange 15' of head 15.

When the various segments of the head and the gripper 47 are adjusted to the positions in which they are shown in Figure 4, the machine is in operative position, and, upon rotation of shaft 13 by means of gear 14 in the proper direction, the strip will be wound into a coil. When the coiling of the strip has been completed, it is then necessary to remove the same from the machine. This is effected by moving pusher head 50 to the left (Figure 1), thereby releasing segments 41, 42 for inward radial movement and furthermore permitting the gripper 47 to release the end of the strip. Following this, the coiled strip is completely pushed off of the several supporting segments by the pusher head, this head having three radial arms 52 which engage the inner face of the coil and completely thrust the same from the machine. The extreme left-hand position of the pusher head is shown in Figure 1.

After discharge of a wrapped coil, it is desired to repeat the operation as quickly as possible, and to this end the pusher head is retracted. If the pusher head is retracted too far, however, the gripping member 47 will be moved to a position so close to the stationary segment 40 that the leading end of strip 49 cannot be inserted between these members. To permit the operator to use fluid pressure in effecting movements of the pusher head, while at the same time preventing this excessive movement of the pusher head, the fluid pressure mechanism already described has been devised.

Thus, prior to retracting the pusher head after discharge of a coil, the operator will move the piston 24 to its extreme left-hand position, as shown in Figure 1, thus establishing a limiting stop within cylinder 16 for the movement of piston 20. After this has been done, piston 20 is moved to the right until it engages this stop, whereupon the parts are positioned as shown in Figure 2. Here the pusher arms 52 have been retracted within the recess defined by flange 15', yet the pusher head has not been moved so far that the slot between the gripper 47 and the stationary drum head 40 has been closed. The leading end of a strip 49 then can be rapidly inserted. After the insertion of the end of such a strip, the pressure behind piston 24 can be relieved in the manner heretofore described so that this piston moves to its right-hand extreme position (Figure 3). Piston 20 then moves to its right-hand position as shown in this same figure, and the strip is firmly gripped so that the coiling operation may be immediately commenced thereafter.

It is believed that the advantages of the invention will be fully understood from the foregoing description. It is obvious, of course, that by modifying the construction of the piston 24, in fact making several concentric pistons, the movements of the piston 20 may be interrupted at any one of a plurality of intermediate points. Furthermore, it is not necessary to utilize pistons which differ in diameter if it is found that compressed air, oil, or the like can be had under different pressures so that it is possible for a higher pressure of energizing fluid to be introduced into cylinder 17 than will be introduced into cylinder 16. Other modifications and adaptations of the invention will be readily apparent to those skilled in the art.

Having thus described the invention, what is claimed as new and desired to be secured by Letters Patent is:

1. A coiling machine comprising in combination, means for gripping the leading edge of a blank, fluid pressure actuated means for actuating said blank gripping means, and fluid pressure actuated means for limiting the movement of said blank gripping means in one direction at the will of the operator.

2. A coiling machine comprising in combination, means for gripping the leading edge of a blank, mechanism including a piston working in a cylinder for actuating said gripping means, and a fluid operated device for halting the movement of said piston intermediate the ends of its stroke at the will of the operator.

3. A coiling machine comprising in combination, blank gripping means, a cylinder, a piston in said cylinder connected to said means, a second cylinder adjacent said first cylinder, a piston in said second cylinder, a member connected to said second piston and adapted to be projected thereby into said first cylinder to limit the movement of the first piston, and fluid pressure means for actuating said pistons.

4. The combination set forth in claim 3 in which the diameter of the second cylinder is greater than the diameter of the first cylinder.

5. In a strip coiling machine, in combination, blank gripping mechanism, fluid pressure actuated means for actuating said mechanism to grip a blank, and fluid pressure actuated means for limiting the movement of said mechanism in gripping direction, at the will of the operator.

ERIK W. MIKAELSON.